United States Patent
de Swardt

(10) Patent No.: US 12,278,531 B2
(45) Date of Patent: Apr. 15, 2025

(54) VACUUM PRESSURE IMPREGNATION METHOD FOR INSULATION SYSTEM

(71) Applicant: The Timken Company, North Canton, OH (US)

(72) Inventor: Jan de Swardt, Eustis, FL (US)

(73) Assignee: The Timken Company, North Canton, OH (US)

(*) Notice: Subject to any disclaimer, the term of this patent is extended or adjusted under 35 U.S.C. 154(b) by 321 days.

(21) Appl. No.: 17/717,630

(22) Filed: Apr. 11, 2022

(65) Prior Publication Data

US 2022/0360153 A1    Nov. 10, 2022

Related U.S. Application Data

(60) Provisional application No. 63/186,413, filed on May 10, 2021.

(51) Int. Cl.
*H02K 15/12* (2025.01)
*H02K 15/10* (2006.01)

(52) U.S. Cl.
CPC .......... *H02K 15/12* (2013.01); *H02K 15/105* (2013.01)

(58) Field of Classification Search
None
See application file for complete search history.

(56) References Cited

U.S. PATENT DOCUMENTS

| | | |
|---|---|---|
| 3,937,855 A | 2/1976 | Gruenwald |
| 4,554,470 A | 11/1985 | Jerson et al. |
| 5,275,545 A | 1/1994 | Ohyanagi et al. |
| 5,341,561 A | 8/1994 | Schorm et al. |
| 8,528,804 B2 | 9/2013 | Lahaie et al. |
| 9,742,249 B2 | 8/2017 | Thaxton et al. |
| 10,748,798 B1 | 8/2020 | Tsai et al. |
| 10,761,035 B2 | 9/2020 | Kudo et al. |

(Continued)

FOREIGN PATENT DOCUMENTS

| | | | |
|---|---|---|---|
| CN | 101086922 | * | 12/2007 |
| CN | 102255448 | * | 11/2011 |

(Continued)

OTHER PUBLICATIONS

Niikura, H. et al. "Global vacuum pressure impregnation insulation applied to hydrogen-cooled generators." Fuji Electric Review 55.3 (2009): 93-98.

*Primary Examiner* — Mandy C Louie
(74) *Attorney, Agent, or Firm* — Michael Best & Friedrich LLP

(57) ABSTRACT

A vacuum pressure impregnation process includes placing a room temperature coil/winding into a pressure vessel with a camera aimed at the coil/winding for inspection, and sealing the pressure vessel to draw a first vacuum level, maintained for a first duration. The coil/winding is flooded with resin and remotely monitored. A second vacuum level is maintained for a second duration while remotely monitoring. A first positive pressure level is applied for a third duration while remotely monitoring, before releasing and drawing a third vacuum level, maintained for a fourth duration while remotely monitoring. A second positive pressure level is applied for a fifth duration while remotely monitoring, before releasing pressure and removing the coil/winding from the pressure vessel.

17 Claims, 2 Drawing Sheets

(56) References Cited

U.S. PATENT DOCUMENTS

| | | |
|---|---|---|
| 10,816,476 B2 | 10/2020 | Nunney et al. |
| 2005/0104252 A1 | 5/2005 | Hirai et al. |
| 2012/0107490 A1 | 5/2012 | Abramov et al. |
| 2015/0349599 A1 | 12/2015 | Yamamoto et al. |
| 2016/0247596 A1 | 8/2016 | Ho et al. |
| 2020/0194172 A1 | 6/2020 | Cremasco et al. |

FOREIGN PATENT DOCUMENTS

| | | | | |
|---|---|---|---|---|
| CN | 107947505 | * | 4/2018 | |
| CN | 108092474 | * | 5/2018 | |
| JP | 2001189226 | * | 7/2001 | |
| JP | 2006141180 | * | 6/2006 | |
| KR | 20170046875 | * | 5/2017 | |
| WO | WO-9822961 A1 | * | 5/1998 | ............. B29C 35/08 |
| WO | WO-2012119774 A2 | * | 9/2012 | ............. H02K 15/12 |

\* cited by examiner

VACUUM PRESSURE IMPREGNATION METHOD FOR INSULATION SYSTEM

CROSS-REFERENCE TO RELATED APPLICATIONS

This application claims priority to U.S. Provisional Patent Application No. 63/186,413, filed on May 10, 2021, the entire contents of which are incorporated by reference herein.

BACKGROUND

The present application relates to vacuum pressure impregnation used in the production of insulation systems for insulating the windings of electric machines subjected to high field strengths. Although widely known and effective, high voltage insulation systems produced through this technique are only designed for use with voltages up to 22 kV.

SUMMARY

In one aspect, the invention provides a vacuum pressure impregnation process to produce an insulation system for a coil/winding for over 22 kV.

In another aspect, the invention provides a coil/winding for over 22 kV, produced by a vacuum pressure impregnation process.

In yet another aspect, the invention provides a vacuum pressure impregnation process including placing a room temperature electric machine coil/winding into a pressure vessel with a camera aimed at the coil/winding for inspection thereof. The pressure vessel is sealed and vacuum is drawn therein to a first vacuum level, which is maintained for a first duration of time. The coil/winding is flooded with low viscosity epoxy, polyester or silicone resin and remotely monitoring at a location away from the pressure vessel with images provided by the camera. Vacuum is drawn in the pressure vessel to a second vacuum level and maintained for a second duration of time while remotely monitoring at a location away from the pressure vessel with images provided by the camera. The second vacuum level is released and a first positive pressure level is applied in the pressure vessel for a third duration of time while remotely monitoring at a location away from the pressure vessel with images provided by the camera. The first positive pressure level is released and vacuum is drawn in the pressure vessel to a third vacuum level and maintaining the vacuum at the third vacuum level for a fourth duration of time while remotely monitoring at a location away from the pressure vessel with images provided by the camera. The third vacuum level is released and a second positive pressure level is applied in the pressure vessel for a fifth duration of time while remotely monitoring at a location away from the pressure vessel with images provided by the camera. The second positive pressure level in the pressure vessel is released, and the coil/winding is removed from the pressure vessel.

In yet another aspect, the invention provides a vacuum pressure impregnation process including placing a room temperature electric machine coil/winding into a pressure vessel without preheating. Vacuum is drawn in the pressure vessel to a first vacuum level, and the vacuum is maintained at the first vacuum level for a first duration of time. The coil/winding is flooded with low viscosity epoxy, polyester or silicone resin. Vacuum is drawn in the pressure vessel to a second vacuum level and maintained for a second duration of time. The second vacuum level is released, and a first positive pressure level is applied in the pressure vessel for a third duration of time. The first positive pressure level is released and vacuum is drawn in the pressure vessel to a third vacuum level, which is maintained for a fourth duration of time. The third vacuum level is released, and a second positive pressure level is applied in the pressure vessel for a fifth duration of time. The second positive pressure level in the pressure vessel is released, and the coil/winding is removed from the pressure vessel.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
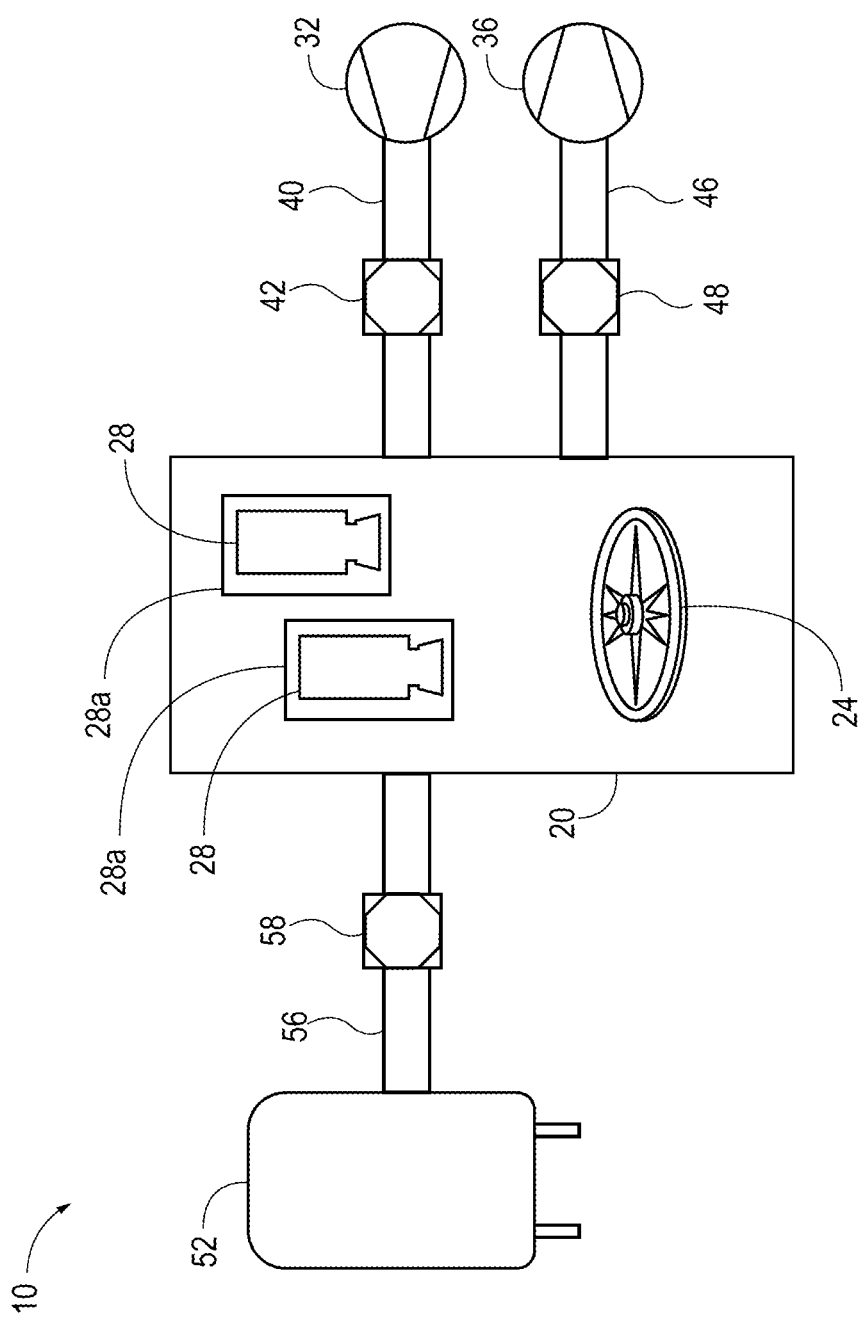
FIG. 1 is a schematic view of a system for carrying out a vacuum pressure impregnation process on a coil/winding of an electric machine.

The insulation system used in medium and high voltage windings (e.g., wire coils wrapped around a stator core to form a stator winding) of an electric machine, operable in some cases as a motor and/or generator, are subjected to high field strengths. Using advanced insulating tapes in combination with a low viscosity epoxy, polyester or silicone resin, an insulating system can be designed to insulate coil windings over the conventional limit of 22 kV, up to and including 25 kV. The impregnation process set forth in the description below is referred to as "Vacuum Pressure Impregnation" or "VPI." Before the method is described, it is noted that FIG. 1 schematically illustrates an exemplary system 10 for carrying out the VPI process. The system 10 includes a pressure vessel 20 defining a process volume or environment into which a coil/winding 24 can be received. The wire turns forming the coil can be assembled with a core to form a complete winding that is subject to the VPI process. However, it is possible to alternately perform the VPI process on a coil alone (e.g., mounted in a fixture) for subsequent assembly with a core to form a winding. The pressure vessel 20 can be certified according to an appropriate code of an engineering or other governing body (e.g., ASME BPVC, NGV 2, AIAA S-081, ABS, DNV). The pressure vessel 20 can be provided with a viewing window (e.g., in a lid thereof), or optionally no viewing window whatsoever, precluding visual observation from the outside. One or more cameras 28 are installed inside the pressure vessel 20. Each camera 28 (e.g., two shown) can be WIFI enabled and battery powered so as to provide wireless operation including image collection and data transmission of the collected images. The cameras 28 can be configured to take still photos and/or video in any desired format (e.g., RAW, JPEG, MP4, MOV, etc.). The cameras 28 can be configured to collected high definition images. The cameras 28 can have on-board memory, which may serve as a back-up in the event that image data is wirelessly transmitted from the pressure vessel 20 in real time during the VPI process. In other constructions, image data is stored to the memory and reviewed post-process rather than in real time. The cameras 28 can be mounted for rotating about one or more axes to effectively change the viewing area. The cameras 28 may optionally be equipped with a zoom function to further change the viewing area. The cameras 28 are installed into a pressure and vacuum sealed enclosure 28A that is fully or at least partially transparent. Each camera 28 can have its own enclosure 28A, or multiple cameras 28 may be positioned in a single enclosure 28A.

Figure 2:
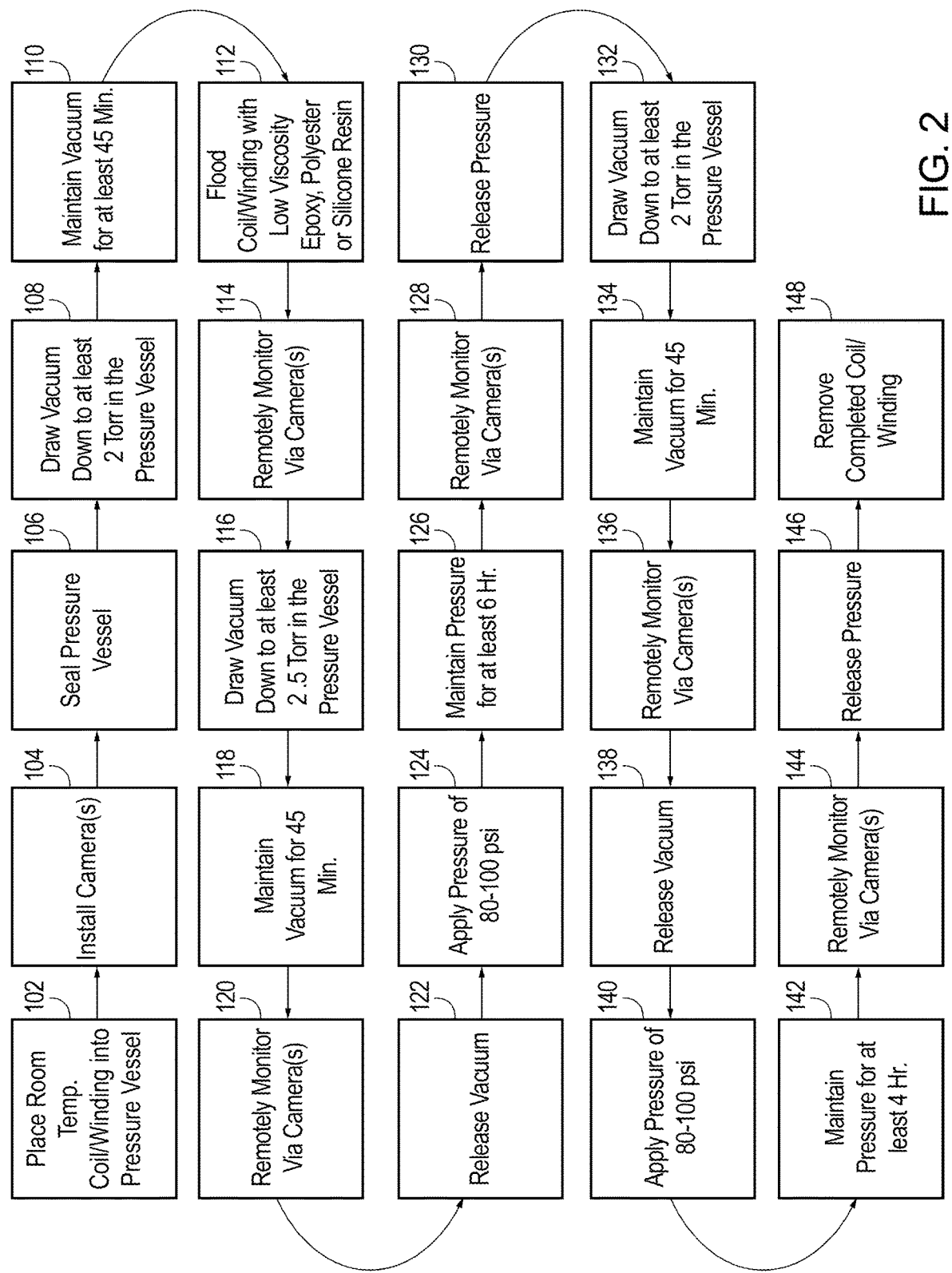
FIG. 2 is a flow diagram of a sequence of steps making up the vacuum pressure impregnation process.

On the right side of FIG. 1, it can be seen that a compressor 32 and a vacuum pump 36 are fluidly connected with the pressure vessel 20 to selectively act on the process volume thereof. According to the illustrated construction, the compressor 32 and the vacuum pump 36 are separately and independently coupled to respective ports on the pressure vessel 20, although other arrangements are optional. The compressor 32 is coupled to the pressure vessel 20 via a pipe(s) 40 and a valve 42 that selectively opens and closes communication between the compressor 32 and the pressure vessel 20. The vacuum pump 36 is coupled to the pressure vessel 20 via a pipe(s) 46 and a valve 48 that selectively opens and closes communication between the vacuum pump 36 and the pressure vessel 20. In addition, as shown on the left side of FIG. 1, a storage or supply vessel 52 is fluidly connected with yet another port on the pressure vessel 20. The storage vessel 52 can contain a quantity of a low viscosity epoxy, polyester or silicone resin to be selectively supplied to the pressure vessel 20 according to the following description. The storage vessel 52 is coupled to the pressure vessel 20 via a pipe(s) 56 and a valve 58 that selectively opens and closes communication between the storage vessel 52 and the pressure vessel 20. The VPI method utilizing the system 10 of FIG. 1 is described below in reference to the flow diagram of FIG. 2.

Contrary to current VPI processes, the coil/winding 24 is not pre-heated, but rather placed into the pressure vessel 20 at room temperature at step 102. If not already present, the camera(s) 28 are installed at step 104 into the pressure and vacuum sealed transparent enclosure(s) 28A inside the pressure vessel 20. As noted below, the cameras 28 are configured to provide a visual monitor of the process, without requiring a human observer in the vicinity of the pressure vessel 20. The pressure vessel 20 is then sealed to prevent gas leakage at step 106. The vacuum pump 36 is operated (with the valve 48 open) to pull a vacuum of at least 2 Torr at step 108. With respect to vacuum, it should be understood that "at least" refers to drawing the pressure down to the stated value or less. At step 108, the pressure may be drawn down to 2 Torr but not less than 400 mTorr. This vacuum level is maintained for at least 45 minutes, according to step 110. After step 110, the valve 58 between the storage vessel 52 and the pressure vessel 20 is opened at step 112 in order to flood and completely cover the coil/winding 24 with the low viscosity epoxy, polyester or silicone resin. The term "low viscosity," which can apply to any of the stated resins, may be considered a term of art commonly used in the industry as a means for categorizing resins. In some constructions, "low viscosity" may refer to a resin having a viscosity of less than 2000 cPs at 77° F. when tested according to IEC 60455. As the coil/winding 24 is exposed to the low viscosity epoxy, polyester or silicone resin, the process is remotely monitored at step 114 by the images from the cameras 28. During the flooding process, the pressure inside the pressure vessel 20 increases slightly. Vacuum is drawn at step 116, via the vacuum pump 36, at least down to 2.5 Torr, but no lower than 400 mTorr in order to prevent boiling of the resin. Once this vacuum level is achieved, it is maintained at step 118 for at least 45 minutes. In some constructions, the vacuum is maintained for a duration not exceeding 60 minutes. However, unlike conventional processes that require the stator winding to be pre-heated and are thus highly sensitive to subsequent processing durations as the winding loses heat, the vacuum level can be maintained for relatively any desired duration at step 118. Especially for a very large coil/winding, extended vacuum exposure may be desirable or necessary to ensure the evacuation of air. The coil/winding 24 is again monitored at step 120 using the remote cameras 28 to ensure that they remain covered with resin. The vacuum is then released at step 122. The vacuum pump valve 48 is closed, the vacuum pump 36 is switched off, and concurrently or thereafter the compressor 32 is switched on and the compressor valve 42 is opened. Pressure of at least 80 psi, but not exceeding 100 psi is then applied to the pressure vessel 20 at step 124 by operation of the compressor 32 with the valve 42 open. After this positive pressure is achieved, it is maintained for at least 6 hours at step 126. The coil/winding 24 is remotely monitored at step 128 by the images from the cameras 28 to ensure that they remain covered with resin. The pressure is released at step 130. At step 132, vacuum is drawn at least down to 2 Torr, but no lower than 400 mTorr in order to prevent boiling of the resin. When this vacuum level is achieved, it is maintained at step 134 for at least 45 minutes. As with step 118, step 134 can be limited to 60 minutes in some constructions, although extended durations can and may be used. The coil/winding 24 is again monitored at step 136 using the remote cameras 28 to ensure that they remain covered with resin. At step 138, the vacuum is released. At step 140, a pressure of at least 80 psi, but not exceeding 100 psi, is applied (by operation of the compressor 32 with the valve 42 open). Once this pressure is achieved, it is maintained for at least 4 hours at step 142. The coil/winding 24 is again monitored at step 144 using the remote cameras 28 to ensure that they remain covered with resin. At step 146, the pressure is released, re-establishing atmospheric pressure to the pressure vessel 20. Here, the VPI process is complete, and the coil/winding 24 can be removed from the pressure vessel 20 at step 148.

This process can be used effectively resulting in a vacuum impregnated insulation system configured for use at very high voltage. If the VPI process is carried out on a coil, the coil may be assembled with a core into a winding. The coil/winding 24 produced by the above process can be rated for and used within an electric machine operating with a field voltage above 22 kV, for example up to 25 kV. Voltage ratings need to be proven to be in accordance with international standards by passing tests stipulated in international standard such as, but not limited to: IEEE std 43. Insulation Resistance; IEEE std 286. Tip up test; IEC 60085. Thermal classification; IEC 60034-18-32 Voltage endurance; and NEMA MG-1 HV Pressure test. Large machines can be wound using this higher voltage, to result in lower current for the same output power, thereby reducing the stator copper losses ($I^2R$ losses). With these lower losses, the output rating of the machine could be increased to achieve a higher output rating. Secondly, the higher voltage can allow systems designed to start the machine directly from the 25 kV supply high voltage line, i.e. without the need for a step down transformer from 25 kV to a lower voltage, for instance 13.8 kV. This saves the space and cost of the transformer as well as reducing the system losses (by removing the losses that the transformer would have introduced).

In spite of the particular advantage of being able to produce products rated for over 22 kV, it should be noted that aspects of the invention, including parts or all of the vacuum pressure impregnation process described above, can be used in the production of lower voltage products—rated below 22 kV. Also, although described above with respect to an AC stator winding, aspects of the invention, including parts or all of the vacuum pressure impregnation process, can apply also to DC field frames, AC rotors, and DC armatures.

What is claimed is:

1. A vacuum pressure impregnation process comprising:
    placing a room temperature electric machine coil/winding into a pressure vessel with a camera aimed at the coil/winding for inspection thereof;
    sealing the pressure vessel and drawing a vacuum therein to a first vacuum level;
    maintaining the vacuum at the first vacuum level for a first duration of time;
    flooding the coil/winding with low viscosity epoxy or silicone resin and remotely monitoring at a location away from the pressure vessel with images provided by the camera;
    drawing a vacuum in the pressure vessel to a second vacuum level and maintaining the vacuum at the second vacuum level for a second duration of time while remotely monitoring at a location away from the pressure vessel with images provided by the camera;
    releasing the second vacuum level and applying a first positive pressure level in the pressure vessel for a third duration of time while remotely monitoring at a location away from the pressure vessel with images provided by the camera;
    releasing the first positive pressure level and drawing a vacuum in the pressure vessel to a third vacuum level and maintaining the vacuum at the third vacuum level for a fourth duration of time while remotely monitoring at a location away from the pressure vessel with images provided by the camera;
    releasing the third vacuum level and applying a second positive pressure level in the pressure vessel for a fifth duration of time while remotely monitoring at a location away from the pressure vessel with images provided by the camera;
    releasing the second positive pressure level in the pressure vessel; and
    removing the coil/winding from the pressure vessel,
    wherein the coil/winding is not preheated before the step of flooding the coil/winding with low viscosity epoxy or silicone resin.

2. The vacuum pressure impregnation process of claim 1, wherein the first vacuum level is a pressure of 2 Torr or less, and the first duration of time is at least 45 minutes.

3. The vacuum pressure impregnation process of claim 1, wherein the second vacuum level is a pressure in the range of 2.5 Torr to 400 mTorr, and the duration of time is at least 45 minutes.

4. The vacuum pressure impregnation process of claim 1, wherein the first positive pressure level is 80 to 100 psi, and the third duration of time is at least 6 hours.

5. The vacuum pressure impregnation process of claim 1, wherein the third vacuum level is a pressure in the range of 2 Torr to 400 mTorr, and the fourth duration of time is at least 45 minutes.

6. The vacuum pressure impregnation process of claim 1, wherein the second positive pressure level is 80 to 100 psi, and the fifth duration of time is at least 4 hours.

7. A vacuum pressure impregnation process comprising:
    placing a room temperature electric machine coil/winding into a pressure vessel without preheating;
    drawing a vacuum in the pressure vessel to a first vacuum level;
    maintaining the vacuum at the first vacuum level for a first duration of time;
    flooding the coil/winding with low viscosity epoxy or silicone resin;
    drawing a vacuum in the pressure vessel to a second vacuum level and maintaining the vacuum at the second vacuum level for a second duration of time;
    releasing the second vacuum level and applying a first positive pressure level in the pressure vessel for a third duration of time;
    releasing the first positive pressure level and drawing a vacuum in the pressure vessel to a third vacuum level and maintaining the vacuum at the third vacuum level for a fourth duration of time;
    releasing the third vacuum level and applying a second positive pressure level in the pressure vessel for a fifth duration of time;
    releasing the second positive pressure level in the pressure vessel; and
    removing the coil/winding from the pressure vessel,
    wherein the coil/winding is not preheated before the step of flooding the coil/winding with low viscosity epoxy or silicone resin.

8. The vacuum pressure impregnation process of claim 7, wherein the coil/winding is remotely monitored at a location away from the pressure vessel with images provided by a camera.

9. The vacuum pressure impregnation process of claim 8, wherein the coil/winding is remotely monitored at a location away from the pressure vessel with images provided by the camera throughout the steps from the resin flooding to the application of the second positive pressure level.

10. The vacuum pressure impregnation process of claim 7, wherein the first vacuum level is a pressure of 2 Torr or less, and the first duration of time is at least 45 minutes.

11. The vacuum pressure impregnation process of claim 7, wherein the second vacuum level is a pressure in the range of 2.5 Torr to 400 mTorr, and the duration of time is at least 45 minutes.

12. The vacuum pressure impregnation process of claim 7, wherein the first positive pressure level is 80 to 100 psi, and the third duration of time is at least 6 hours.

13. The vacuum pressure impregnation process of claim 7, wherein the third vacuum level is a pressure in the range of 2 Torr to 400 mTorr, and the fourth duration of time is at least 45 minutes.

14. The vacuum pressure impregnation process of claim 7, wherein the second positive pressure level is 80 to 100 psi, and the fifth duration of time is at least 4 hours.

15. A vacuum pressure impregnation process comprising:
    placing an electric machine coil/winding into a pressure vessel;
    drawing a vacuum in the pressure vessel to a first vacuum level;
    maintaining the vacuum at a first vacuum level of 2 Torr or less for a first duration of at least 45 minutes;
    flooding the coil/winding with low viscosity epoxy or silicone resin;
    drawing a vacuum in the pressure vessel to a second vacuum level of 2.5 Torr to 400 mTorr for a second duration of time of at least 45 minutes;
    releasing the second vacuum level and applying a first positive pressure level of 80 to 100 psi in the pressure vessel for a third duration of time of at least 6 hours;
    releasing the first positive pressure level; and removing the coil/winding from the pressure vessel,
wherein the coil/winding is not preheated before the step of flooding the coil/winding with low viscosity epoxy or silicone resin.

16. The vacuum pressure impregnation process of claim 15, wherein after releasing the first positive pressure level and before removing the coil/winding from the pressure vessel, the process further comprises drawing a vacuum in the pressure vessel to a third vacuum level of 2 Torr to 400 mTorr for a fourth duration of time of at least 45 minutes before releasing the third vacuum level in the pressure vessel and applying a second positive pressure level of 80 to 100 psi in the pressure vessel for a fifth duration of time of at least 4 hours.

17. The vacuum pressure impregnation process of claim 15, wherein the coil/winding is remotely monitored at a location away from the pressure vessel with images provided by a camera throughout the steps from the resin flooding to the application of the second positive pressure level for the fifth duration of time.

* * * * *